US008571737B2

(12) United States Patent
Tamagawa

(10) Patent No.: US 8,571,737 B2
(45) Date of Patent: Oct. 29, 2013

(54) HYBRID VEHICLE AND CONTROL METHOD THEREOF

(75) Inventor: Yutaka Tamagawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/514,582

(22) PCT Filed: Dec. 9, 2010

(86) PCT No.: PCT/JP2010/072178
§ 371 (c)(1),
(2), (4) Date: Jun. 7, 2012

(87) PCT Pub. No.: WO2011/074483
PCT Pub. Date: Jun. 23, 2011

(65) Prior Publication Data
US 2012/0245785 A1   Sep. 27, 2012

(30) Foreign Application Priority Data

Dec. 16, 2009   (JP) .................................. 2009-285416

(51) Int. Cl.
*G06F 17/00* (2006.01)
(52) U.S. Cl.
USPC ....... 701/22; 180/65.23; 180/65.25; 180/165; 123/41.01; 123/41.44; 123/41.49; 123/549; 903/903; 903/916; 903/946; 60/431; 60/671; 62/172; 62/402; 290/17; 290/27; 290/45; 318/139
(58) Field of Classification Search
USPC ....................... 701/22; 180/65.23, 65.25, 165; 903/65.23, 65.25, 165; 123/903, 916, 123/946; 60/323.1, 431, 671; 318/139; 290/45, 17, 27; 219/205; 62/172, 402
See application file for complete search history.

(56) References Cited

U.S. PATENT DOCUMENTS

| 5,993,351 | A | 11/1999 | Deguchi et al. |
| 6,083,139 | A | 7/2000 | Deguchi et al. |
| 6,190,282 | B1 | 2/2001 | Deguchi et al. |
| 6,380,640 | B1 * | 4/2002 | Kanamori et al. .......... 290/40 C |
| 7,279,855 | B2 * | 10/2007 | Tahara et al. .................. 318/46 |
| 7,576,501 | B2 * | 8/2009 | Okubo et al. ................. 318/139 |
| 7,819,212 | B2 * | 10/2010 | Kawasaki ................ 180/65.265 |
| 2003/0102175 | A1 | 6/2003 | Wakashiro et al. |
| 2006/0152180 | A1 * | 7/2006 | Tahara et al. ................. 318/139 |
| 2006/0272869 | A1 | 12/2006 | Hidaka et al. |
| 2007/0275819 | A1 | 11/2007 | Hirata |
| 2008/0215201 | A1 * | 9/2008 | Okubo et al. ................... 701/22 |
| 2009/0143189 | A1 | 6/2009 | Hasegawa et al. |

(Continued)

FOREIGN PATENT DOCUMENTS

| JP | 08-098322 | 4/1996 |
| JP | 09-224304 A | 8/1997 |

(Continued)

*Primary Examiner* — McDieunel Marc
(74) *Attorney, Agent, or Firm* — Arent Fox LLP

(57) ABSTRACT

A hybrid vehicle which runs on power from at least one of an electric motor and an engine. When a required output exceeds a sum of an output of the electric motor which is driven by electric power supplied from a battery and an output of the engine while the hybrid vehicle is running on a drive mode in which at least the engine works as a drive source with a clutch engaged, a transmission ratio changing unit increases a ratio of electrical transmission to mechanical transmission of the output of the engine, and an engaging/disengaging control unit releases the clutch at a time point when the mechanically-transmitted output of the engine becomes 0, with the clutch engaged.

4 Claims, 9 Drawing Sheets

(56) References Cited

U.S. PATENT DOCUMENTS

| | | | |
|---|---|---|---|
| 2009/0200095 A1* | 8/2009 | Kawasaki | 180/65.265 |
| 2009/0236159 A1 | 9/2009 | Shibata et al. | |
| 2009/0250278 A1* | 10/2009 | Kawasaki et al. | 180/65.275 |
| 2009/0314565 A1* | 12/2009 | Suzuki | 180/65.285 |
| 2010/0075798 A1 | 3/2010 | Suzuki et al. | |
| 2010/0204862 A1* | 8/2010 | Uejima et al. | 701/22 |
| 2012/0245783 A1* | 9/2012 | Tamagawa | 701/22 |
| 2012/0259496 A1* | 10/2012 | Ikegami | 701/22 |

FOREIGN PATENT DOCUMENTS

| | | |
|---|---|---|
| JP | 11-089007 A | 3/1999 |
| JP | 11-165566 A | 6/1999 |
| JP | 11-178110 A | 7/1999 |
| JP | 2000-023311 A | 1/2000 |
| JP | 3052753 B2 | 4/2000 |
| JP | 2000-136835 A | 5/2000 |
| JP | 2002-238104 A | 8/2002 |
| JP | 2006-020401 A | 1/2006 |
| JP | 2006-335196 A | 12/2006 |
| JP | 2007-022118 A | 2/2007 |
| JP | 2009-280082 A | 12/2009 |
| JP | 2009-292287 A | 12/2009 |
| JP | 2010-125956 A | 6/2010 |

* cited by examiner

HYBRID VEHICLE AND CONTROL METHOD THEREOF

CROSS-REFERENCED TO RELATED APPLICATION

This application is a National Stage entry of International Application PCT/JP2010/072178, filed Dec. 9, 2010, which claims priority to Japanese Patent Application No. 2009-285416, filed Dec. 16, 2009, the disclosure of the prior applications are hereby incorporated in its entirety by reference.

TECHNICAL FIELD

The present invention relates to a hybrid vehicle which controls the release of a power transmission engaging/disengaging unit which is executed when the vehicle is shifted from a drive mode in which at least an internal combustion engine works as a drive source to a series drive mode in which an electric motor works as a drive source, and a control method thereof.

BACKGROUND ART

In a series and parallel combined electric vehicle (SPHV) disclosed in Patent Literature 1, when the revolution speed of a motor decreases to be lower than a predetermined value while the vehicle is running in a parallel hybrid vehicle (PHV) mode, a mechanical connection between a generator and the motor is released by releasing a clutch, whereby the vehicle is shifted to a series hybrid vehicle (SHV) mode. When the vehicle is running in the PHV mode, the wheels are driven by mechanical output from an engine, and when the vehicle is started, accelerated or slowed or stopped using brakes, a difference between a required output and the mechanical output of the engine is made up for by the motor. Additionally, when the vehicle is running in the SHV mode, the generator is driven by the mechanical output from the engine, and the motor is driven by electric power generated by the generator and electric power discharged from a battery, whereby the wheels are driven by the motor.

Related Art Literature

Patent Literature
 Patent Literature 1: JP-3052753-B

OUTLINE OF THE INVENTION

Problems to be Solved by the Invention

When the SPHV of Patent Literature 1 described above is running in the PHV mode, the required output is obtained from the mechanical output of the engine and assist output of the motor depending upon conditions. On the other hand, when in the SHV mode, the required output is obtained only from the output of the motor. Consequently, even in the event that the clutch releasing conditions are established to release the clutch immediately when the vehicle is shifted from the PHV mode to the SHV mode, there may be a situation in which the required output cannot be dealt with immediately in case a change in output required of the motor is large.

For example, in the event that the state-of-charge of the battery is low when the vehicle is shifted to the SHV mode, it is necessary that the generator is driven by the mechanical output of the engine so that the motor is driven by electric power generated by the generator. However, the response of the engine and the generator is not so high that there may be a situation in which electric power corresponding to the required output is not supplied to the motor immediately after the clutch is released. As this occurs, the motor cannot output a driving force corresponding to the required output, and therefore, a shock is generated when the clutch is released, resulting in a possibility that the driver feels a sensation of physical disorder. Additionally, the battery needs to have a sufficient capacity for the battery to make up for a difference between electric power that the motor needs to meet the required output required immediately after the clutch is released and electric power that the generator can generate.

An object of the invention is to provide a hybrid vehicle which can release a power transmission engaging/disengaging unit while satisfying a required output when the vehicle is shifted from a drive mode in which at least an internal combustion engine works as a drive source to a series drive mode in which an electric motor works as a drive source, and a control method thereof.

Means for Solving the Problems

A first aspect of the invention is a hybrid vehicle including
 an engine (e.g., an engine 111 in embodiment),
 a generator (e.g., a generator 113 in embodiment) which is driven by the engine to generate electric power,
 a battery (e.g., a battery 101 in embodiment) for supplying electric power to an electric motor,
 the electric motor (e.g., an electric motor 109 in embodiment) which is connected to a drive wheel (e.g., a drive wheel 133 in embodiment) and which is driven by electric power supplied from at least one of the battery and the generator, and
 a power transmission engaging/disengaging unit (e.g., a lockup clutch 117 in embodiment) which is disposed between the generator and the drive wheel for engaging and disengaging a power transmission line from the engine to the drive wheel via the generator, the hybrid vehicle being capable of running on power supplied from at least one of the electric motor and the engine,
  the hybrid vehicle further including
  a transmission ratio changing unit (e.g., a management ECU 123 in embodiment) for changing a ratio of electrical transmission to mechanical transmission of an output of the engine,
  an engaging/disengaging control unit (e.g., the management ECU 123 in embodiment) for controlling the power transmission engaging/disengaging unit to be released when the hybrid vehicle is shifted from a drive mode in which at least the engine works as a drive source to a series drive mode in which the electric motor works as a drive source, and
  a required output calculation unit (e.g., the management ECU 123 in embodiment) for calculating a required output required of the hybrid vehicle based on an accelerator pedal opening which corresponds to an operation of an accelerator pedal and a running speed of the hybrid vehicle,
  wherein, when the required output calculated by the required output calculation unit exceeds a sum of an output of the electric motor which is driven by electric power supplied from the battery and the output of the engine while the hybrid vehicle is running on the drive mode in which at least the engine works as a drive source with the power transmission engaging/disengaging unit engaged, the transmission ratio changing unit increases the ratio of electrical transmission to mechanical transmission of the output of the engine, and the engaging/disengaging control unit controls the power transmission engaging/disengaging unit to be released at a time point when the mechanically-transmitted output of the engine becomes 0, with the power transmission engaging/disengaging unit engaged.

A second aspect of the invention which includes the first aspect is the hybrid vehicle, further including a battery output control unit (e.g., the management ECU 123 in embodiment) for controlling the supply of electric power from the battery to the electric motor, and an engine control unit (e.g., the management ECU 123 in embodiment) for controlling the operation of the engine, wherein, after the power transmission engaging/disengaging unit is released, the battery output control unit decreases the supply of electric power from the battery to the electric motor, and the engine control unit operates the engine so as to stay on an optimum specific fuel consumption line (e.g., a BSFC bottom line in embodiment) which is formed by connecting operation points where an optimum specific fuel consumption is attained so that the output of the engine increases as the supply of electric power from the battery to the electric motor decreases.

A third aspect of the invention which includes either the first or second aspect is the hybrid vehicle, further including an engine control unit (e.g., the management ECU 123 in embodiment) for controlling the operation of the engine, wherein, when the required output is increased while the hybrid vehicle is running on the drive mode in which the engine works as a drive source with the power transmission engaging/disengaging unit engaged, the engine control unit increases the output of the engine until an operation point reaches the optimum specific fuel consumption line (e.g., the BSFC bottom line in embodiment) which is formed by connecting operation points where an optimum specific fuel consumption is attained, and wherein, when the required output exceeds the output of the engine which is operated at an operation point on the optimum specific fuel consumption line, the engine control unit operates the engine so as to stay on the optimum specific fuel consumption line, and the electric motor which is driven by electric power supplied from the battery outputs electric power which makes up for the insufficient output of the engine.

A fourth aspect of the invention which includes the third aspect is the hybrid vehicle, wherein the electric motor outputs electric power which makes up for the insufficient output of the engine to such an extent that the electric motor can output according to the state of the battery.

A fifth aspect of the invention provides a control method for a hybrid vehicle, the hybrid vehicle including an engine (e.g., an engine 111 in embodiment), a generator (e.g., a generator 113 in embodiment) which is driven by the engine to generate electric power, a battery (e.g., a battery 101 in embodiment) for supplying electric power to an electric motor, the electric motor (e.g., an electric motor 109 in embodiment) which is connected to a drive wheel (e.g., a drive wheel 133 in embodiment) and which is driven by electric power supplied from at least one of the battery and the generator, and a power transmission engaging/disengaging unit (e.g., a lockup clutch 117 in embodiment) which is disposed between the generator and the drive wheel for engaging and disengaging a power transmission line from the engine to the drive wheel via the generator, the hybrid vehicle being capable of running on power supplied from at least one of the electric motor and the engine, the control method including calculating a required output required of the hybrid vehicle based on an accelerator pedal opening which corresponds to an operation of an accelerator pedal and a running speed of the hybrid vehicle, and when the required output so calculated exceeds a sum of an output of the electric motor which is driven by electric power supplied from the battery and an output of the engine while the hybrid vehicle is running on a drive mode in which at least the engine works as a drive source with the power transmission engaging/disengaging unit engaged, increasing a ratio of electrical transmission to mechanical transmission of the output of the engine and releasing the power transmission engaging/disengaging unit at a time point when the mechanically-transmitted output of the engine becomes 0, with the power transmission engaging/disengaging unit engaged.

Advantage of the Invention

According to the first through fifth aspects the power transmission engaging/disengaging unit can be released while satisfying the required output when the vehicle is shifted from the drive mode in which at least the engine works as a drive source to the series drive mode in which the electric motor works as a drive source.

According to the second aspect, the engine is operated at the operation points on the optimum specific fuel consumption line while the hybrid vehicle is shifted to the series drive mode, and therefore, the specific fuel consumption of the engine is not decreased.

According to the third and fourth aspects, the output of the engine can be mechanically transmitted until the electric motor becomes ready to output electric power which makes up for the insufficient output of the engine, and therefore, the hybrid vehicle can run with a good overall efficiency.

MODE FOR CARRYING OUT THE INVENTION

Embodiments of the invention will be described by reference to the drawings.

An HEV (Hybrid Electric Vehicle) includes an electric motor and an engine and runs on driving force of the electric motor and/or the engine depending upon running conditions of the vehicle. HEVs are roughly classified into two types; a series HEV and a parallel HEV. The series HEV runs on the driving force of the electric motor. The engine is used only for generation of electric power, and electric power generated by making use of the driving force of the engine is stored in a battery or supplied to the electric motor. On the other hand, the parallel HEV runs on driving force of either or both of the electric motor and the engine.

There is also known a series/parallel HEV in which both the series and parallel configurations are combined. In this type of HEV, a clutch is engaged or disengaged (engaged/disengaged) depending upon the running conditions of the vehicle, whereby the transmission system of driving force is switched to either of the series and parallel configurations. In particular, when the vehicle runs at low speeds, the clutch is disengaged to adopt the series configuration, while when the vehicle runs at intermediate or high speeds, the clutch is engaged to adopt the parallel configuration. In the following description, a drive mode using the series configuration will be referred to as a "series drive mode."

Figure 1:
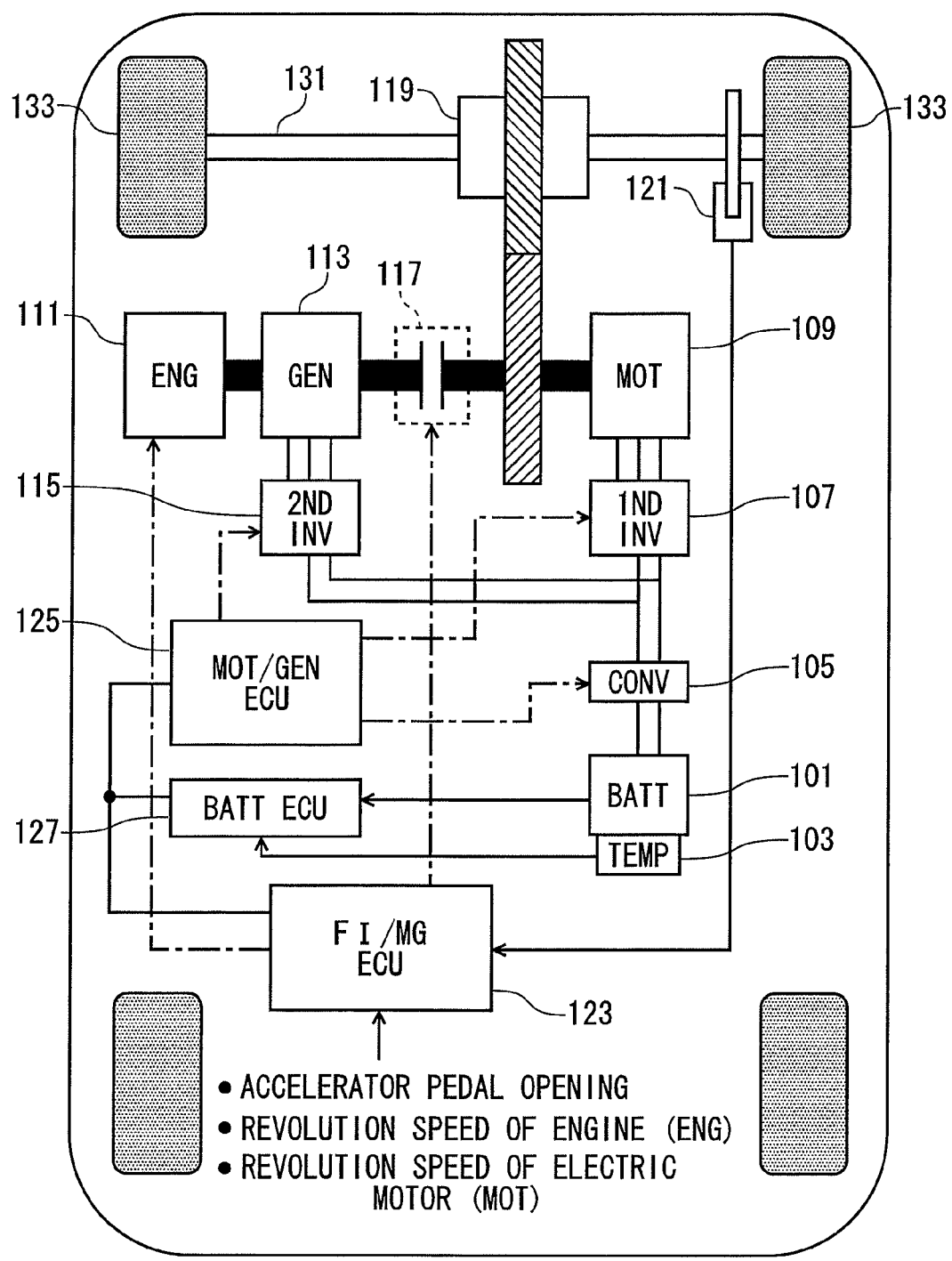
FIG. 1 shows an internal block configuration of a series/parallel HEV.

In an embodiment, a hybrid vehicle according to the invention will be described as a series/parallel HEV (hereinafter, referred to as a "hybrid vehicle"). FIG. 1 shows an internal block configuration of the series/parallel HEV. The hybrid vehicle shown in FIG. 1 includes a battery (BATT) 101, a temperature sensor 103 (TEMP), a converter (CONV) 105, a first inverter ($1^{st}$ INV) 107, an electric motor (MOT) 109, an engine (ENG) 111, a generator (GEN) 113, a second inverter ($2^{nd}$ INV) 115, a lockup clutch (hereinafter, referred to simply as a "clutch") 117, a gearbox (hereinafter, referred to simply as a "gear") 119, a vehicle speed sensor 121, a management ECU (FI/MG ECU) 123, a motor ECU (MOT/GEN ECU) 125 and a battery ECU (BATT ECU) 127. Further, the vehicle includes a sensor (not shown) for detecting a revolution speed of the electric motor 109 and a sensor (not shown) for detecting a revolution speed of the engine 111.

The battery 101 has plural battery cells which are connected in series and supplies, for example, a high voltage of 100 to 200V. The battery cells are lithium ion batteries or nickel-metal hydride batteries. The temperature sensor 103 detects a temperature of the battery 101 (hereinafter, referred to as a "battery temperature"). A signal indicating the battery temperature detected by the temperature sensor 103 is sent to the battery ECU 127.

The converter 105 increases or decreases a direct current output voltage of the battery 101 while keeping it as direct current. The first inverter 107 converts a direct current voltage into an alternating current voltage so as to supply a three-phase current to the electric motor 109. Additionally, the first inverter 107 converts an alternating current voltage which is inputted when the electric motor 109 performs a regenerative operation into a direct current voltage for storage in the battery 101.

The electric motor 109 generates power on which the vehicle runs. Torque generated in the electric motor 109 is transmitted to drive shafts 131 via the gear 119. Note that a rotor of the electric motor 109 is connected directly to the gear 119. Additionally, the electric motor 109 operates as a generator when regenerative brakes are applied, and electric power generated in the electric motor 109 is stored in the battery 101.

The engine 111 is used only for the generator 113 when the hybrid vehicle runs on the series drive mode with the clutch 117 disengaged. However, when the clutch 117 is engaged, the output of the engine 111 is transmitted to the drive shafts 131 via the generator 113, the clutch 117 and the gear 119 as mechanical energy necessary to drive the hybrid vehicle. The engine 111 is connected directly to a rotor of the generator 113.

The generator 113 generates electric power by making use of the power of the engine 111. The electric power generated by the generator 113 is stored in the battery 101 or is supplied to the electric motor 109. The second converter 115 converts an alternating current generated in the generator 113 into a direct current voltage. The electric power converted by the second inverter 115 is stored in the battery 101 or is supplied to the electric motor 109 via the first converter 107.

The clutch 117 engages or disengages a driving force transmission line from the engine 111 to the drive wheels 133 based on an instruction from a management ECU 123. The gear 119 is a single speed fixed gear which corresponds to a fifth speed, for example. Consequently, the gear 119 converts a driving force from the engine 111 via the generator 113 or a driving force from the electric motor 109 into a revolution speed and torque at a specific gear ratio for transmission to the drive shafts 131. The vehicle speed sensor 121 detects a running speed of the vehicle (a vehicle speed). A signal indicating the vehicle speed detected by the vehicle speed sensor 121 is sent to the management ECU 123.

The management ECU 123 calculates a required output based on an accelerator pedal opening which corresponds to an operation of an accelerator pedal by a driver of the hybrid vehicle and a vehicle speed, switches driving force transmission systems, controls the engagement or disengagement of the clutch 117 and controls the engine 111. The control of the engine 111 by the management ECU 123 is indicated by an alternate long and short dash line in FIG. 1. The details of the management ECU 123 will be described later.

The motor ECU 125 controls the switching of switching elements which make up the converter 105, the first inverter 107 and the second inverter 115 to thereby control the operation of the electric motor 109 or the generator 113. The control of the converter 105, the first inverter 107 and the second inverter 115 by the motor ECU 125 is indicated by alternate long and short dash lines in FIG. 1.

The battery ECU 127 calculates a state-of-charge (SOC) of the battery 101 based on information on the battery temperature obtained from the temperature sensor 103, and charging and discharging currents and terminal voltage of the battery 101.

Figure 2:
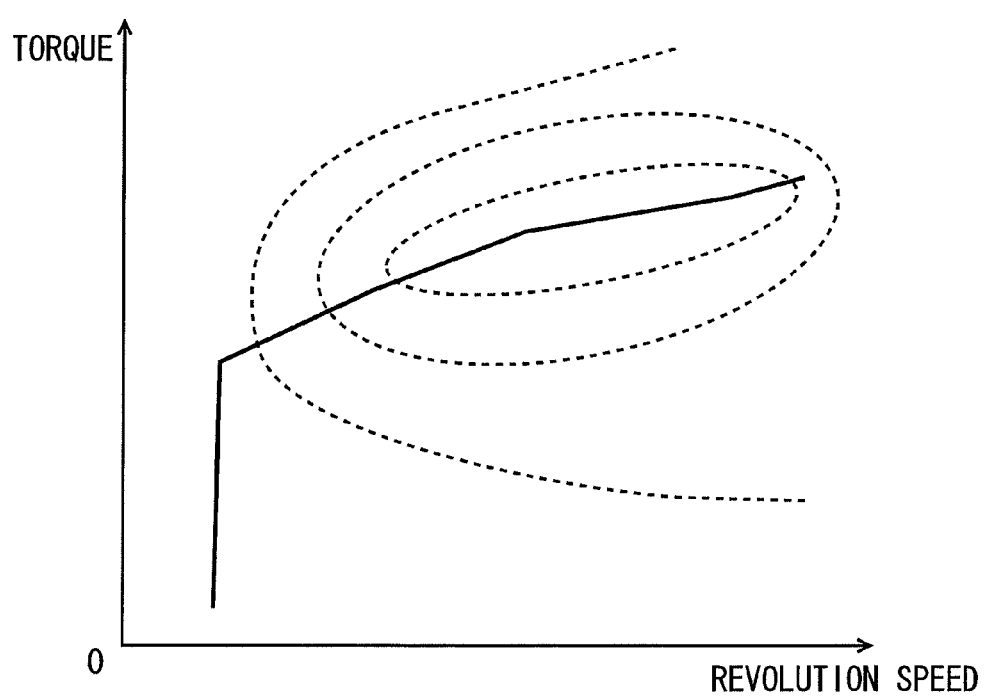
FIG. 2 shows characteristics of an engine 111 in relation to thermal efficiency.

FIG. 2 shows characteristics of the engine 111 in relation to thermal efficiency thereof. In FIG. 2, an ordinates axis denotes the torque of the engine 111, and an abscissas axis denotes the revolution speed of the engine 111. In FIG. 2, a thick solid line is a line which connects operation points of the engine 111 where an optimum specific fuel consumption is attained (a BSFC bottom line). The clutch 117 is engaged or disengaged in accordance with the driving force transmission system selected. Namely, the clutch 117 is disengaged when the vehicle runs on the series drive mode and is engaged when the output of the engine 111 is used as mechanical energy.

The output energy of the engine 111 is mechanical energy. However, mechanical energy outputted by the engine 111 when the clutch 117 is disengaged is converted into electrical energy by the generator 113 and is thereafter used to drive the vehicle. A transmission form of energy adopted here is referred to as an "electrical transmission." On the other hand, mechanical energy outputted by the engine 111 when the clutch 117 is engaged is consumed as it is via the generator 113 and the gear 119 to drive the vehicle. A transmission form of energy adopted here is referred to as a "mechanical transmission."

Figure 3:
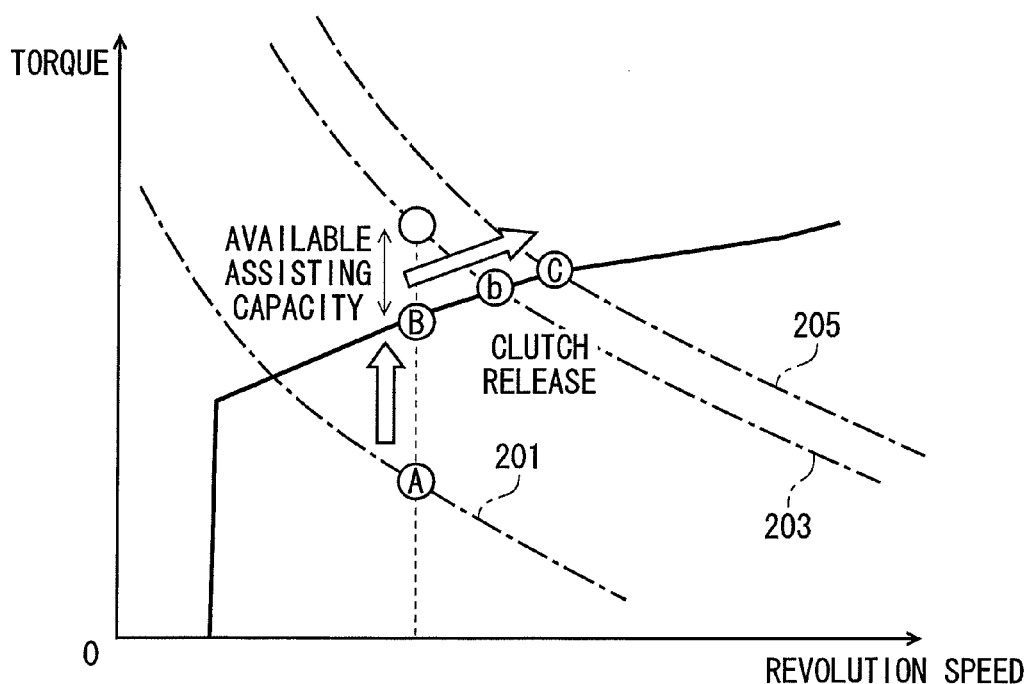
FIG. 3 shows a transition of an operation point of the engine 111 when a clutch 117 is released in accordance with an increase in required output.
Figure 4:
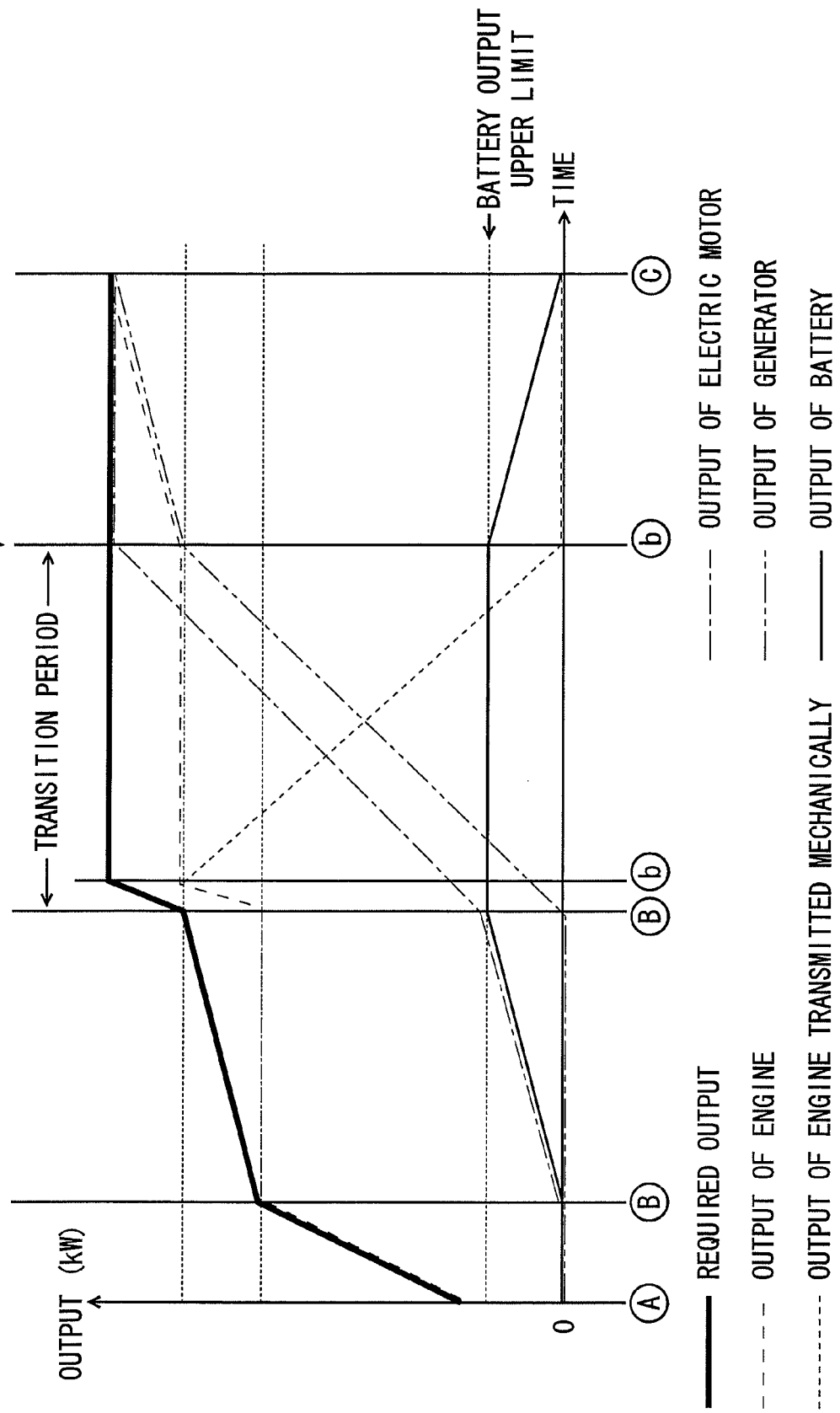
FIG. 4 shows changes in respective outputs when the clutch 117 is released in accordance with an increase in required output.
Figure 5:
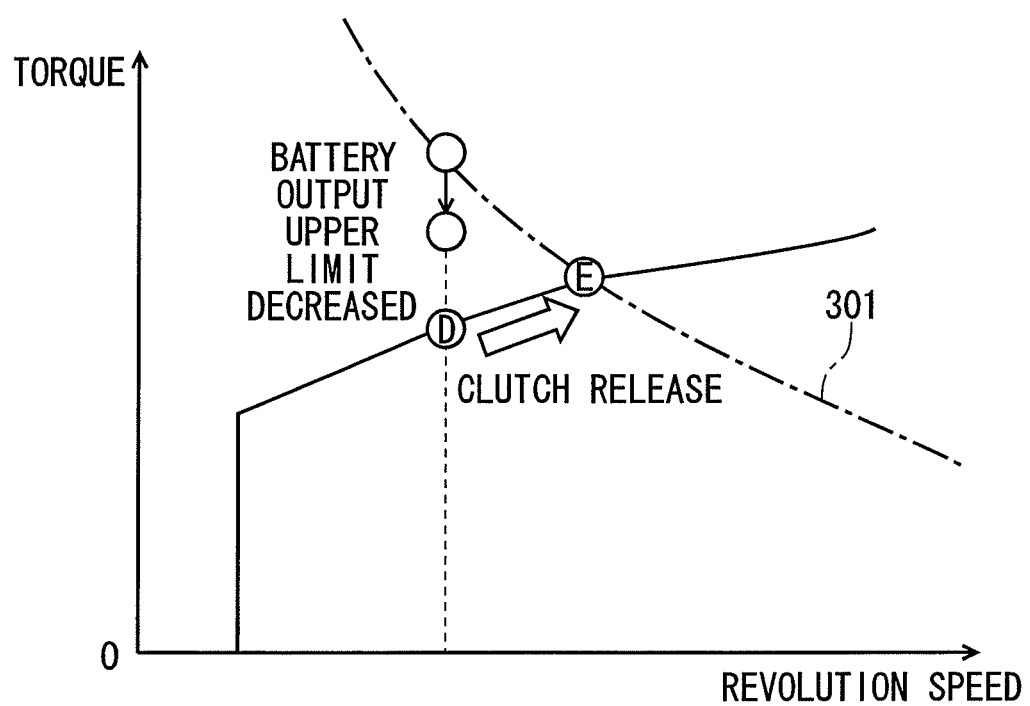
FIG. 5 shows a transition of the operation point of the engine 111 when the clutch 117 is released in accordance with a change in state of a battery 101.
Figure 6:
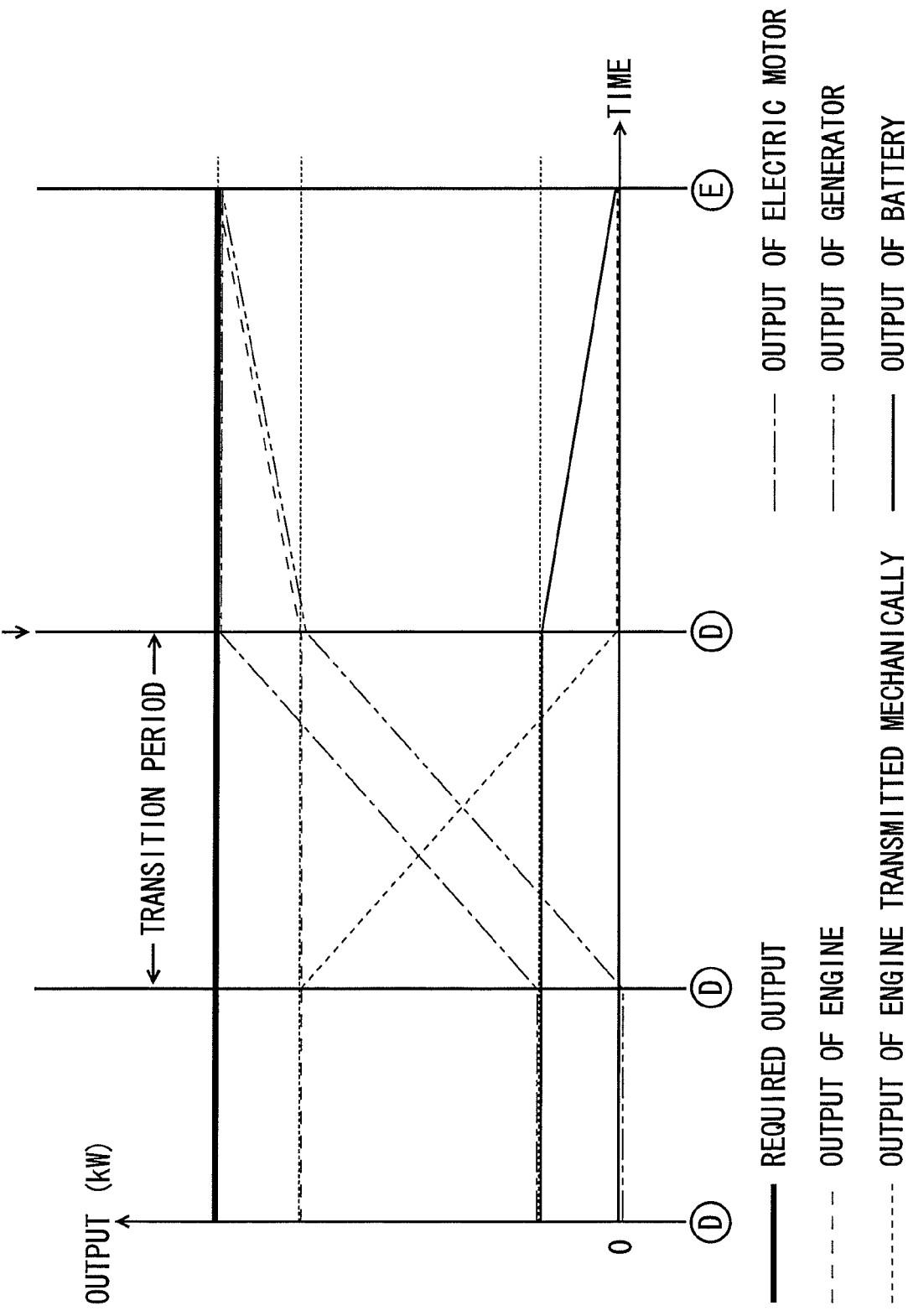
FIG. 6 shows changes in respective outputs when the clutch 117 is released in accordance with a change in state of the battery 101.

Hereinafter, a control executed by the management ECU 123 to release the clutch 117 while the hybrid vehicle of this embodiment is running on a drive mode in which the engine 111 works as a drive source with the clutch 117 engaged will be described by reference to FIGS. 3 to 6. FIG. 3 shows a transition of an operation point of the engine 111 when the clutch 117 is released in accordance with an increase in required output. FIG. 4 shows changes in respective outputs when the clutch 117 is released in accordance with an increase in required output. FIG. 5 shows a transition of the operation point of the engine 111 when the clutch 117 is released in accordance with a change in state of a battery 101. FIG. 6 shows changes in respective outputs when the clutch 117 is released in accordance with a change in state of the battery 101. Note that it is understood that no loss is generated when transmitting energy in FIGS. 4 to 6.

(Embodiment 1)

Hereinafter, referring to FIGS. 3 and 4, a control executed by the management ECU 123 to release to clutch 117 in accordance with an increase in required output will be described. The engine 111 is operated at an operation point A shown in FIG. 3 when a required output with the clutch 117 engaged is equal to an output indicated by an alternate long and short dash line denoted by reference numeral 201. As this occurs, the electric motor 109 is not driven. When the required output increases from this state due to the operation of the accelerator pedal by the driver, the management ECU 123 controls the engine 111 so as to increase the torque while maintaining the revolution speed. As this occurs, the operation point of the engine 111 is shifted upwards from the operation point A in FIG. 3. Note that an upper limit of the operation point of the engine 111 is set on a BSFC bottom line.

Consequently, for example, when an output indicated by an alternate long and short dash line denoted by reference numeral 203 is required as a required output, the management ECU 123 controls the engine 111 so as to increase the torque while maintaining the revolution speed to thereby operate at an operation point B on the BSFC bottom line. As shown in FIGS. 3 and 4, however, the output of the engine 111 which operates at the operation point B does not satisfy the required output. Because of this, the management ECU 123 instructs the motor ECU 125 to cause the electric motor 109 to output electric power corresponding to an insufficient output (=the required output−the output of the engine 111) by which the output of the engine 111 cannot meet the required output.

At this time point, the electric motor 109 is driven by electric power supplied from the battery 101. However, depending upon the state of the battery 101, there may be a situation in which the electric motor 109 cannot output electric power corresponding to the insufficient output. For example, when the state-of-charge (SOC) of the battery 101 is low, there may be a situation in which the battery 101 cannot supply electric power required by the electric motor 109. Additionally, when the temperature of the battery 101 is low, the electric power outputted from the battery 101 is decreased. Consequently, the battery ECU 127 calculates an output upper limit of the battery 101 (a battery output upper limit) based on the SOC of the battery and the battery temperature. The management ECU 123 instructs the motor ECU 125 to cause the electric motor 109 to output electric power corresponding to the insufficient output as much as possible within an available outputting capacity (an available assisting capacity).

Figure 7A:
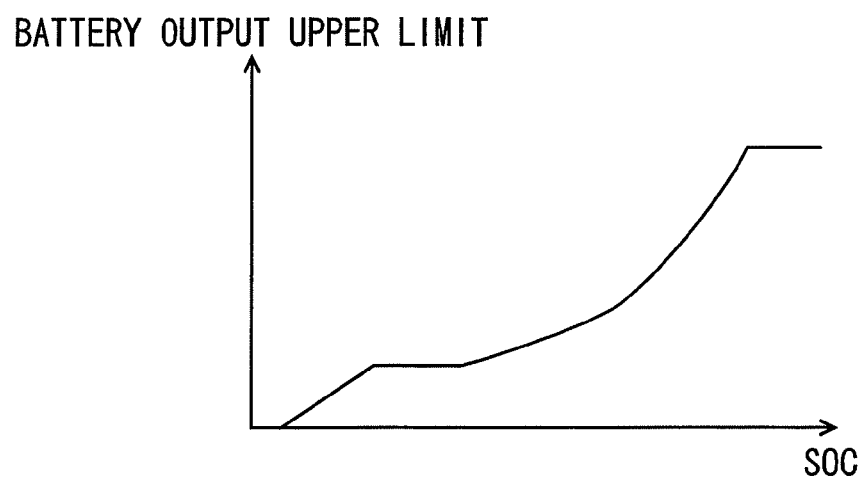
FIG. 7A shows a relation between SOC and battery output upper limit.
Figure 7B:
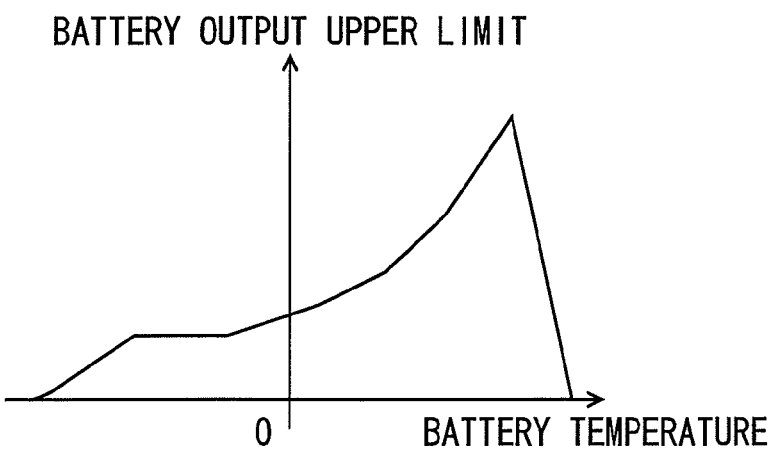
FIG. 7B shows a relation between battery temperature and battery output upper limit.

The battery ECU 127 calculates an SOC of the battery 101 based on an integral value of charging and discharging currents of the battery 101 and a terminal voltage of the battery 101. In addition, the battery ECU 127 sets a lower value as a battery output upper limit based on a relation between SOC and battery output upper limit shown in FIG. 7A and a relation between battery temperature and battery output upper limit shown in FIG. 7B.

However, when an output indicated by an alternate long and short dash line denoted by reference numeral 205 is required as a required output, the electric motor 109 cannot output electric power corresponding to an insufficient output by which the output of the engine 111 cannot meet the required output. Consequently, the management ECU 123 executes a control to cause the vehicle to shift to the series drive mode. As this occurs, the management ECU 123 controls respective outputs of the engine 111, the generator 113 and the electric motor 109 with the clutch 117 kept engaged as shown in FIG. 4 and thereafter causes the vehicle to shift to the series drive mode by releasing the clutch 117. The management ECU 123 shifts the operation point of the engine 111 from the operation point B to an operation point b shown in FIG. 3 along the BSFC bottom line during the transition period to the series drive mode until the clutch 117 is released.

In addition, the motor ECU 125 controls the second inverter 115 so that part of the output of the engine 111 which is mechanically transmitted to the drive shafts 133 is used for generation of electric power by the generator 113 so as to increase a ratio of electrical transmission to mechanical transmission of the output of the engine 111. Namely, as shown in FIG. 4, the output of the engine 111 which is mechanically transmitted is gradually decreased, while the output which is electrically transmitted is gradually increased. The output of the engine 111 which is mechanically transmitted is supplied to the generator 113, and the output (electric power) of the generator 113 is supplied to the electric motor 109. Consequently, as the output that is electrically transmitted is increased, the respective outputs of the generator 113 and the electric motor 109 are increased.

The output of the generator 113 equals the output of the engine 111 and the output of the electric motor 109 equals the required output at a time point when the operation point of the engine 111 shifts to the operation point b shown in FIG. 3 so that the output that is mechanically transmitted becomes 0. As this occurs, the management ECU 123 executes a control to release the clutch 117. However, in addition to the output of the generator 113, the output of the battery 101 is also included in the electric power that is supplied to the electric motor 109 then. After having released the clutch 117, the management ECU 123 shifts the operation point of the engine 111 to an operation point C shown in FIG. 3 and approximates the electric power supplied from the battery 101 to the electric motor 109 (the output of the battery 101) to 0 so that all the electric power that is supplied to the electric motor 109 is made up of the output from the generator 113.

Thus, when the vehicle is shifted to the series drive mode because the required output when the vehicle runs on the drive mode in which the engine 111 works as a drive source exceeds the sum of the output of the engine 111 and the output of the electric motor 109, the engine 111 and the electric motor 109 output the driving force which equals the required output. Consequently, when the vehicle is shifted from the drive mode in which the engine 111 works as a drive source to the series drive mode, no shock is generated, and therefore, the driver is prevented from feeling a sensation of physical disorder even when the clutch 117 is released. In addition, the output which exceeds the battery output upper limit is not required of the battery 101, and therefore, the battery 101 is used properly. Consequently, a battery of a large capacity does not have to be used to deal with the temporary situation.

Further, the engine 111 is operated at the operation point on the BSFC bottom line during the transition period to the series drive mode, and therefore, the fuel consumption will not be deteriorated.

(Embodiment 2)

Hereinafter, referring to FIGS. 5 and 6, a control will be described which is executed by the management ECU 123 when releasing the clutch 117 in accordance with a change in state of the battery 101. In an initial state shown in FIG. 6, with the clutch 117 engaged, the engine 111 is controlled so as to operate at an operation point D on a BSFC bottom line shown in FIG. 5, and the electric motor 109 is controlled so as to output electric power corresponding to an insufficient output by which an output of the engine 111 cannot meet a required output (=the required output−the output of the engine 111) which is indicated by an alternate long and short dash line denoted by reference numeral 301 in FIG. 5 by utilizing electric power supplied from the battery 101. As this occurs, there can be a situation in which an output upper limit of the battery 101 (a battery output upper limit) is decreased due to a reduction in SOC or a reduction in battery temperature and hence, the generator 113 cannot output electric power corresponding to the insufficient output.

The battery ECU 127 calculates a battery output upper limit based on the SOC and battery temperature of the battery 101. When a sum of an output of the battery 109 corresponding to the battery output upper limit (hereinafter, referred to as an "output upper limit of the electric motor 109") and the output of the engine 111 exceeds the required output, as shown in FIG. 6, the management ECU 123 controls the respective outputs of the generator 113 and the electric motor 109 while keeping the operation point of the engine 111 staying on the BSFC bottom line with the clutch 117 engaged and thereafter releases the clutch 117 so that the vehicle is shifted to the series drive mode.

During a transition period to the series drive mode until the clutch 117 is released, the management ECU 123 controls the second inverter 115 so that part of the output of the engine 111 which is mechanically transmitted is used for generation of electric power by the generator 113 so as to increase a ratio of electric transmission to mechanical transmission of the output of the engine 111. Namely, as shown in FIG. 6, the output of the engine 111 which is mechanically transmitted is gradually decreased, while the output which is electrically transmitted is gradually increased. The output of the engine 111 which is electrically transmitted is supplied to the generator 113, and the output (electric power) of the generator 113 is supplied to the electric motor 109. Consequently, as the output that is electrically transmitted increases, the respective outputs of the generator 113 and the electric motor 109 increase.

At a time point when the output of the engine 111 which is mechanically transmitted becomes 0, the output of the generator 113 equals the output of the engine 111, and the output of the electric motor 109 equals the required output, whereupon the management ECU 123 controls the clutch 117 to be released. As this occurs, however, the electric power supplied to the electric motor 109 includes the output of the battery 101 in addition to the output of the generator 113. After having released the clutch 117, the management ECU 123 shifts the operation point of the engine 111 to an operation point E shown in FIG. 5 and approximates the electric power supplied from the battery 101 to the electric motor 109 (the output of the battery 101) to 0 so that all the electric power supplied to the electric motor 109 is made up of the output from the generator 113.

Thus, when the vehicle is shifted to the series drive mode because the battery output upper limit of the battery 101 decreases and the sum of the output of the electric motor 109 which corresponds to the battery output upper limit (the output upper limit of the electric motor 109) and the output of the engine 111 exceeds the required output, the engine 111 and the electric motor 109 output driving force which equals the required output. Consequently, when the vehicle is shifted from the drive mode in which the engine 111 works as a drive source to the series drive mode, no shock is generated, and therefore, the driver is prevented from feeling a sensation of physical disorder even when the clutch 117 is released. In addition, the output which exceeds the battery output upper limit is not required of the battery 101, and therefore, the battery 101 is used properly. Consequently, a battery of a large capacity does not have to be used to deal with the temporary situation. Further, the engine 111 is operated at the operation point on the BSFC bottom line during the transition period to the series drive mode, and therefore, the fuel consumption will not be deteriorated.

Figure 8:
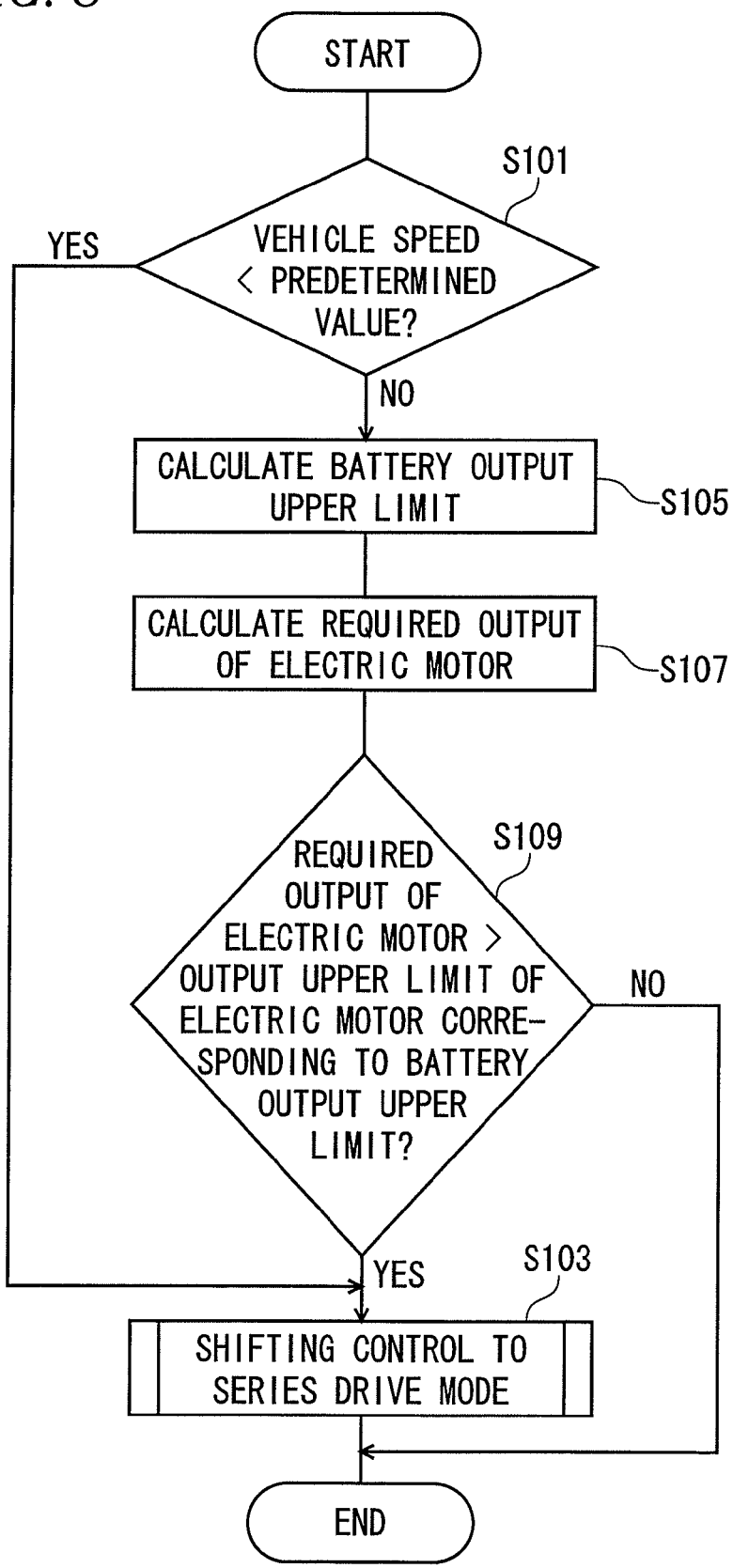
FIG. 8 shows operations of a management ECU 123.
Figure 9:
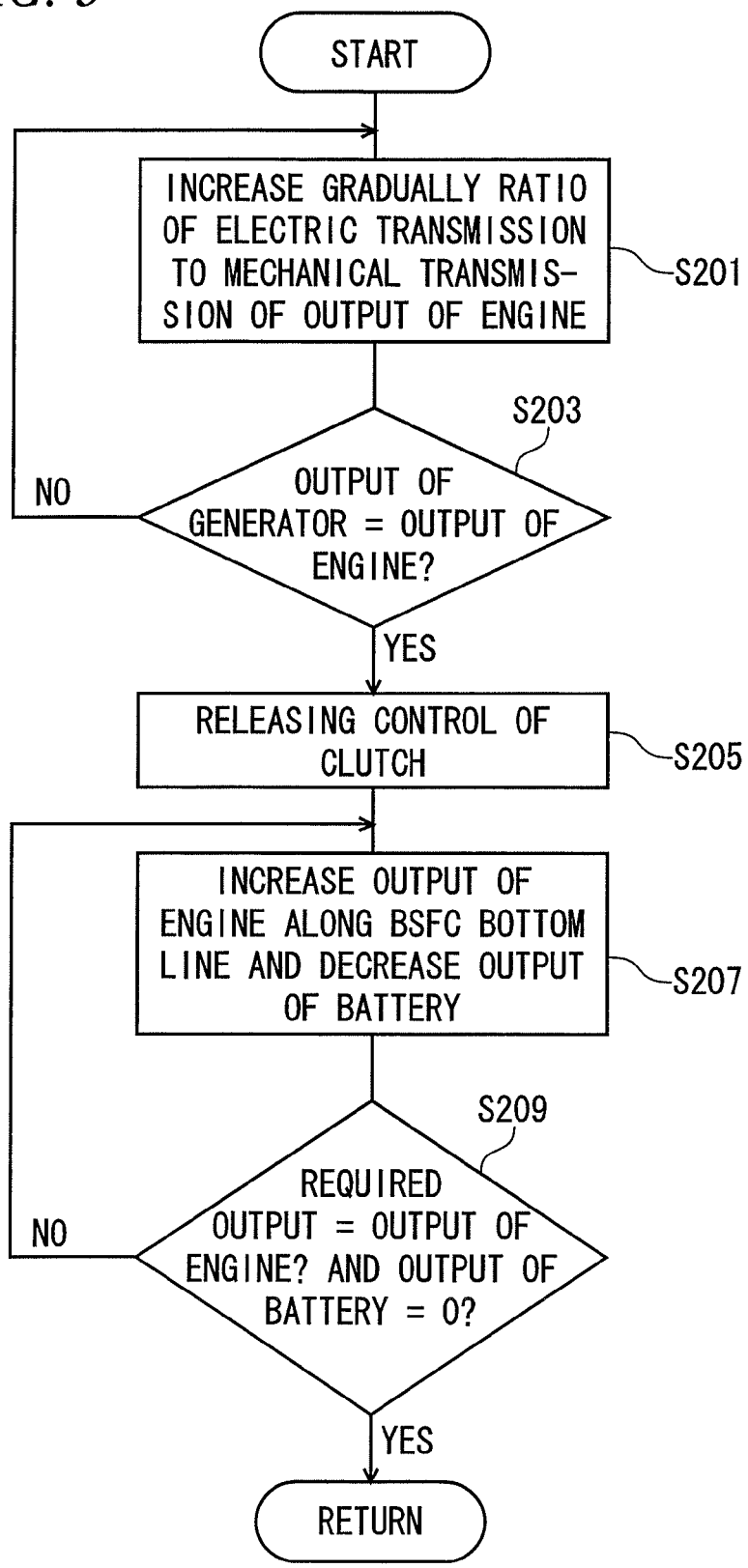
FIG. 9 shows operations of the management ECU 123.

Hereinafter, the operation of the management ECU 123 including the control of the engine 111, the generator 113, the electric motor 109 and the battery 101 and the release of the clutch 117 will be described by reference to FIGS. 8 and 9. FIGS. 8 and 9 show operations of the management ECU 123. When the hybrid vehicle is running on the drive mode in which at least the engine 111 works as a drive source with the clutch 117 engaged, as shown in FIG. 8, the management ECU 123 determines whether or not the vehicle speed is slower than a predetermined value (step S101). If the vehicle speed is determined to be slower than the predetermined value, the control flow proceeds to step S103, whereas if the vehicle speed is determined to be equal to or faster than the predetermined value, the control flow proceeds to step S105.

In step S103, the management ECU 123 executes a control to cause the vehicle to shift to the series drive mode shown in FIG. 9. The details of the drive mode shifting control to the series drive mode will be described later. In step S 105, the battery ECU 127 calculates an output upper limit of the battery 101 (a battery output upper limit) based on the SOC and battery temperature of the battery 101. Next, the management ECU 123 calculates an insufficient output by which the output of the engine 111 which is operated on the BSFC line cannot satisfy a required output (=the required output−the output of the engine 111) and which is an output required of the electric motor 109 (step S107).

Next, the management ECU 123 determines whether or not the required output required of the electric motor 109 which is calculated in step S107 is larger than the output of the electric motor 109 which corresponds to the battery output upper limit (the output upper limit of the battery 109) calculated in step S105 (step S109). If the required output required of the electric motor 109 is larger than the output upper limit of the electric motor 109, the control flow proceeds to step S103. On the other hand, if the required output required of the electric motor 109 is equal to or smaller than the output upper limit of the electric motor 109, the management ECU 123 ends the operation.

In step S103, the management ECU 123 executes the drive mode shifting control to the series drive mode with the clutch 117 left engaged. Hereinafter, the details of this control will be described by reference to FIG. 9. As shown in FIG. 9, the management ECU 123 instructs the motor ECU 125 to control the generator 113 and the electric motor 109 so that the ratio of electric transmission to mechanical transmission of the output of the engine 111 with the clutch 117 left engaged (step S201). Namely, the output of the engine 111 which is mechanically transmitted is gradually decreased, while the output of the engine 111 which is electrically transmitted is gradually increased. The output of the engine 111 which is transmitted electrically is supplied to the generator 113, and the output (electric power) of the generator 113 is supplied to the electric motor 109. Consequently, as the output that is electrically transmitted increases, the respective outputs of the generator 113 and the electric motor 109 increase.

Next, the management ECU 123 determines whether or not the output of the generator 113 equals the output of the engine 111 (step S203). If these outputs are equal to each other, the control flow proceeds to step S205, whereas if they are not equal, the control flow returns to step S201. In step S205, the management ECU 123 executes the control to release the clutch 117. Next, the management ECU 123 instructs the motor ECU 125 to control the engine 111 and the battery 101 so that the output of the engine 111 increases along the BSFC bottom line while the output of the battery 101 decreases whereby all the electric power supplied to the electric motor 109 is made up of the output from the generator 113 (step S207). Next, the management ECU 123 determines whether or not the required output equals the output of the engine and whether or not the output of the battery 101 is 0 (step S209). The management ECU 123 continues to execute the operation in step S207 until the two conditions are met and ends the operation thereof at a time point when the two conditions are met.

Thus, in the event that the control by the management ECU 123 that has been described above is executed in the hybrid vehicle of the embodiment, when the vehicle is shifted to the series drive mode because the required output exceeds the sum of the output of the engine 111 and the output of the electric motor 109 due to an increase in required output or a reduction in battery output upper limit, the engine 111 and the electric motor 109 output driving force equal to the required output. Consequently, no shock is generated when the vehicle is shifted from the drive mode in which the engine 111 works as a drive source to the series drive mode, and hence, the driver is prevented from feeling a sensation of physical disorder even when the clutch 117 is released. Additionally, the output which exceeds the battery output upper limit is not required of the battery 101, and therefore, the battery 101 is used properly. Consequently, a battery of a large capacity does not have to be used to deal with the temporary situation. Further, the engine 111 is operated at the operation point on the BSFC bottom line during the transition period to the series drive mode, and therefore, the fuel consumption will not be deteriorated.

While the invention has been described in detail and by reference to the specific embodiments, it is obvious to those skilled in the art that various alterations or modifications can be made to the invention without departing from the spirit and scope of the invention.

This patent application is based on Japanese Patent Application (No. 2009-285416) filed on Dec. 16, 2009, the contents of which are incorporated herein by reference.

Description Of Reference Numerals

101 Battery (BATT); 103 Temperature sensor (TEMP); 105 Converter (CONV); 107 First inverter ($1^{st}$ INV); 109 electric motor (MOT); 111 Engine (ENG); 113 Generator (GEN); 115 Second inverter ($2^{nd}$ INV); 117 Lockup clutch; 119 Gearbox; 121 Vehicle speed sensor; 123 Management ECU (FI/MG ECU); 125 Motor ECU (MOT/GEN ECU); 127 Battery ECU (BATT ECU); 131 Drive shaft; 133 Drive wheel.

The invention claimed is:

1. A hybrid vehicle including
an engine,
a generator which is driven by the engine to generate electric power,
a battery for supplying electric power to an electric motor,
the electric motor which is connected to a drive wheel and which is driven by electric power supplied from at least one of the battery and the generator, and
a power transmission engaging/disengaging unit which is disposed between the generator and the drive wheel for engaging and disengaging a power transmission line from the engine to the drive wheel via the generator, the hybrid vehicle being capable of running on power supplied from at least one of the electric motor and the engine,
the hybrid vehicle further including
a transmission ratio changing unit for changing a ratio of electrical transmission to mechanical transmission of an output of the engine,
an engaging/disengaging control unit for controlling the power transmission engaging/disengaging unit to be released when the hybrid vehicle is shifted from a drive mode in which at least the engine works as a drive source to a series drive mode in which the electric motor works as a drive source,
a required output calculation unit for calculating a required output required of the hybrid vehicle based on an accelerator pedal opening which corresponds to an operation of an accelerator pedal and a running speed of the hybrid vehicle, and
an engine control unit for controlling the operation of the engine,
wherein, when the required output calculated by the required output calculation unit exceeds a sum of an output of the electric motor which is driven by electric power supplied from the battery and the output of the engine while the hybrid vehicle is running on the drive mode in which at least the engine works as a drive source with the power transmission engaging/disengaging unit engaged, the transmission ratio changing unit increases the ratio of electrical transmission to mechanical transmission of the output of the engine, and the engaging/disengaging control unit controls the power transmission engaging/disengaging unit to be released at a time point when the mechanically-transmitted output of the engine becomes 0, with the power transmission engaging/disengaging unit engaged,
wherein, when the required output is increased while the hybrid vehicle is running on the drive mode in which the engine works as a drive source with the power transmission enqaqing/disengaging unit engaged, the engine control unit increases the output of the engine until an operation point reaches the optimum specific fuel consumption line which is formed by connecting operation points where an optimum specific fuel consumption is attained, and
wherein, when the required output exceeds the output of the engine which is operated at an operation point on the optimum specific fuel consumption line, the engine control unit operates the engine so as to stay on the optimum specific fuel consumption line, and the electric motor which is driven by electric power supplied from the battery outputs electric power which makes up for the insufficient output of the engine.

2. The hybrid vehicle of claim 1, further including
a battery output control unit for controlling the supply of electric power from the battery to the electric motor,
wherein, after the power transmission engaging/disengaging unit is released, the battery output control unit decreases the supply of electric power from the battery to the electric motor, and the engine control unit operates the engine so as to stay on the optimum specific fuel consumption line so that the output of the engine increases as the supply of electric power from the battery to the electric motor decreases.

3. The hybrid vehicle of claim 1,
wherein the electric motor outputs electric power which makes up for the insufficient output of the engine to such an extent that the electric motor can output according to the state of the battery.

4. A control method for a hybrid vehicle,
the hybrid vehicle including
  an engine
  a generator which is driven by the engine to generate electric power,
  a battery for supplying electric power to an electric motor,
  the electric motor which is connected to a drive wheel and which is driven by electric power supplied from at least one of the battery and the generator, and
  a power transmission engaging/disengaging unit which is disposed between the generator and the drive wheel for engaging and disengaging a power transmission line from the engine to the drive wheel via the generator, the hybrid vehicle being capable of running on power supplied from at least one of the electric motor and the engine,
the control method including
  calculating a required output required of the hybrid vehicle based on an accelerator pedal opening which corresponds to an operation of an accelerator pedal and a running speed of the hybrid vehicle,
  when the required output so calculated exceeds a sum of an output of the electric motor which is driven by electric power supplied from the battery and an output of the engine while the hybrid vehicle is running on a drive mode in which at least the engine works as a drive source with the power transmission engaging/disengaging unit engaged, increasing a ratio of electrical transmission to mechanical transmission of the output of the engine and releasing the power transmission engaging/disengaging unit at a time point when the mechanically-transmitted output of the engine becomes 0, with the power transmission engaging/disengaging unit engaged,
  when the required output is increased while the hybrid vehicle is running on the drive mode in which the engine works as a drive source with the power transmission engaging/disengaging unit engaged, increasing the output of the engine until an operation point reaches the optimum specific fuel consumption line which is formed by connecting operation points where an optimum specific fuel consumption is attained, and
  when the required output exceeds the output of the engine which is operated at an operation point on the optimum specific fuel consumption line, the engine control unit operates the engine so as to stay on the optimum specific fuel consumption line, and the electric motor which is driven by electric power supplied from the battery outputs electric power which makes up for the insufficient output of the engine.

* * * * *